United States Patent
Nakajima (10) Patent No.: US 8,889,764 B2
(45) Date of Patent: Nov. 18, 2014

(54) WATER-BASED INK FOR INKJET RECORDING, AND METHOD AND APPARATUS FOR INKJET RECORDING USING THE SAME

(75) Inventor: Naoko Nakajima, Tokyo (JP)

(73) Assignee: Konica Minolta IJ Technologies, Inc. (JP)

( * ) Notice: Subject to any disclaimer, the term of this patent is extended or adjusted under 35 U.S.C. 154(b) by 107 days.

(21) Appl. No.: 13/482,456

(22) Filed: May 29, 2012

(65) Prior Publication Data

US 2012/0306964 A1 Dec. 6, 2012

(30) Foreign Application Priority Data

May 30, 2011 (JP) ................. 2011-120708

(51) Int. Cl.
| | |
|---|---|
| C09D 11/10 | (2014.01) |
| B41J 2/165 | (2006.01) |
| B41J 2/175 | (2006.01) |
| C08K 5/05 | (2006.01) |
| C08K 5/06 | (2006.01) |
| C08K 5/20 | (2006.01) |
| C09D 11/322 | (2014.01) |
| C09D 11/38 | (2014.01) |

(52) U.S. Cl.
CPC ............. *B41J 2/165* (2013.01); *C09D 11/322* (2013.01); *C09D 11/10* (2013.01); *C09D 11/38* (2013.01); *B41J 2/175* (2013.01)
USPC ........... 523/160; 524/173; 524/226; 524/317; 524/376; 524/386; 347/22; 347/54; 427/466

(58) Field of Classification Search
USPC ........... 523/160; 524/173, 226, 317, 376, 386
See application file for complete search history.

(56) References Cited

FOREIGN PATENT DOCUMENTS

| | | |
|---|---|---|
| JP | 6-88048 A | 3/1994 |
| JP | 2006-77232 A | 3/2006 |
| JP | 2007-196466 A | 8/2007 |

OTHER PUBLICATIONS

Machine translation of JP 2007-196466 to Hiruma et al. (Aug. 9, 2007).*
Notice of Reasons for Rejection for Japanese Application No. 2011-120708; Dispatch Date: Aug. 20, 2013, with English Translation.

* cited by examiner

*Primary Examiner* — Vu A Nguyen
(74) *Attorney, Agent, or Firm* — Cantor Colburn LLP (57) ABSTRACT

A water-based ink for inkjet recording is provided with color material, binder resin, surfactant, and water-based solvent, wherein when the ink is heated, 1) a viscosity of the ink is more than 10 mPa·s and 30 mPa·s or less, the viscosity being measured over the ink weight change rate range of 0% to 10%; 2) a viscosity of the ink is 200 mPa·s at any one of the ink weight change rate within 35% or more and 55% or less, the viscosity being measured by the E-type viscometer at 25° C. and 1 rpm; and 3) a surface tension at 25° C. of the ink at the ink weight change rate of 5% is lower than a surface tension at 25° C. of the ink at the ink weight change rate of 0%.

12 Claims, 1 Drawing Sheet

WATER-BASED INK FOR INKJET RECORDING, AND METHOD AND APPARATUS FOR INKJET RECORDING USING THE SAME

CROSS REFERENCE TO RELATED APPLICATIONS

This application claims the priority of Japanese Patent Application No. 2011-120708, filed on May 30, 2011, the disclosure of which including the specification and drawings is incorporated herein by reference in its entirety.

TECHNICAL FIELD

The present invention relates to a water-based ink for inkjet recording, and a method and apparatus for inkjet recording using the water-based ink.

BACKGROUND ART

A variety of known ink materials used for printers, printing machines, and markers are classified into water-based inks containing water and water-based solvents, and solvent inks containing non-water-based solvents. Recently, in order to reduce environmental load and negative impact on the health of consumers and printing technicians, switchover to water-based inks has been increasingly required even in fields in which oil-based inks are mainly used. For example, although solvent inks have been commonly used for outdoor displays and signboards, which require long-term weatherability, as well as for printing on recording media that do not absorb water-based inks, such as polyvinyl chloride sheets, switchover to water-based inks that are free from non-water based solvent has been required in such fields.

A variety of printing methods using these inks are also known. Among them, inkjet recording is preferred because of the unnecessity of the fabrication of printing plates, suitability for high-variety, low-volume production, and usage of less ink.

As such water-based inks for inkjet recording, for example, ink compositions containing colorants, lubricants, penetrating agents, and water are known (see, for example, PTL 1).

CITATION LIST

Patent Literature

PTL 1: Japanese Patent Application Laid-Open No. 2006-77232

SUMMARY OF INVENTION

Technical Problem

The water-based ink such as that described in PTL 1, however, is hard to be absorbed into recording media that do not absorb water, such as polyvinyl chloride sheets. Thus, in such a case, "liquid merging" may occur in which individual ink droplets landed on the recording medium move and merge with neighboring ones before they are dried and fixed on the recording medium. Liquid merging, which entails the displacement of ink droplets from the positions at which they should exist, may cause "blank streaks" that appear as the color of the background recording medium, or "color bleeding" that is the phenomenon in which ink droplets of different colors are mixed, leading to reduced image quality.

It is contemplated that the occurrence of blank streaks and color bleeding caused by liquid merging can be suppressed by increasing the ink viscosity so as to inhibit the movement of ink droplets on the recording medium. Unfortunately, however, excessively viscous ink is difficult to spread in a wetting manner (or level) and thus makes the surface of ink coating after drying textured, making it difficult to impart gloss to the image. Namely, it has been difficult in the art to achieve, at the same time, the formation of an image that is free from blank streaks and color bleeding caused by liquid merging, and the formation of a glossy image.

The present invention has been made in consideration of the circumstances above. An object of the present invention is to provide a water-based ink for inkjet recording that can form a glossy image free from blank streaks and color bleeding caused by liquid merging.

Solution to Problem

The present inventors established that a glossy image free from blank streaks and color bleeding caused by liquid merging can be formed by controlling the thickening behavior of ink over the period of heating (or ink drying characteristics).

Specifically, in order to achieve at least one of the above mentioned objects, a water-based ink for inkjet recording reflecting a first aspect according to the present invention relates to the followings.

[1] A water-based ink for inkjet recording including a binder resin, a color material, a surfactant; and a water-based solvent, wherein:

where an ink weight change rate when the ink is heated is expressed by the following equation:

$$\text{ink weight change rate (\%)} = ((\text{weight of ink before heating} - \text{weight of ink after heating})/\text{weight of ink before heating}) \times 100,$$

(1) a viscosity of the ink is more than 10 mPa·s and 30 mPa·s or less, the viscosity being measured by an E-type viscometer at 25° C. and 1 rpm over the ink weight change rate range of 0% to 10%, (2) a viscosity of the ink is 200 mPa·s at any one of the ink weight change rate within 35% or more and 55% or less, the viscosity being measured by the E-type viscometer at 25° C. and 1 rpm, and (3) a surface tension at 25° C. of the ink at the ink weight change rate of 5% is lower than a surface tension at 25° C. of the ink at the ink weight change rate of 0%.

[2] The water-based ink for inkjet recording according to [1], wherein the surfactant is a fluorine-containing surfactant.

[3] The water-based ink for inkjet recording according to [1] or [2], wherein the water-based solvent includes β-alkoxypropionamide.

[4] The water-based ink for inkjet recording according to any one of [1] to [3], wherein the water-based solvent includes a water, a water-soluble organic solvent (A) having a surface tension of 45 mN/m or less, and a water-soluble organic solvent (B) selected from the group consisting of cyclic solvents containing a nitrogen atom or a sulfur atom, cyclic ester solvents, lactic acid esters, 3-alkoxypropionamide, alkylene glycol diether, alkylene glycol monoether monoester, and dimethyl sulfoxide; and an amount ratio of the water-soluble organic solvent (B) is 20 to 40% by mass based on a total amount of the water-soluble organic solvent (A) and the water-soluble organic solvent (B).

[5] The water-based ink for inkjet recording according to any one of [1] to [4], wherein the binder resin is a water-soluble resin.

[6] The water-based ink for inkjet recording according to any one of [1] to [5], wherein the color material is a pigment.
[7] The water-based ink for inkjet recording according to [5], wherein the water-soluble resin is an acrylic resin having an acid value of 50 to 300 mgKOH/g.

A second aspect according to the present invention relates to an inkjet recording method and an inkjet recording apparatus below.

[8] An inkjet recording method, the method including ejecting the water-based ink for inkjet recording according to any one of [1] to [7] from an inkjet head for landing onto a recording medium, wherein a meniscus of the ink in the inkjet head is constantly vibrated while the ink is not ejected.
[9] The inkjet recording method according to [8], further including ejecting the ink from the inkjet head to a non-image region.
[10] The inkjet recording method according to [8] or [9], further including heating ink applied onto the recording medium.
[11] The inkjet recording method according to any one of [8] to [10], wherein the recording medium is a non-water-absorbing recording medium or a low water-absorbing recording medium.
[12] An inkjet recording apparatus including an inkjet head, the inkjet head accommodating the water-based ink for inkjet recording according to any one of [1] to [7].
[13] The inkjet recording apparatus according to [12] further including a heating unit for heating ink droplets applied onto the recording medium.
[14] The inkjet recording apparatus according to [12] or [13] further including a cleaning unit for cleaning a surface of the inkjet head, the surface including a nozzle opening.

Advantageous Effects of Invention

The present invention can provide a water-based ink for inkjet recording that can form a glossy image without blank streaks and color bleeding attributed to the liquid merging.

DESCRIPTION OF EMBODIMENTS

Hereinafter, detailed description for implementing the present invention and Examples will be given. These description and Examples are given for more specifically exemplifying the present invention, and can be modified in various ways without departing from the spirit and scope of the present invention. The present invention will not be limited to the description below.

1. Water-Based Ink for Inkjet Recording

A water-based ink for inkjet recording according to the present invention (hereinafter, referred to as an "ink" in some cases) contains at least a binder resin, a color material, a surfactant, and a water-based solvent.

Binder Resin

The binder resin used for the ink according to the present invention has a function to fix (bind) landed ink droplets to a recording medium. It is also required that the binder resin have a function not only to enhance rubfastness and waterfastness of ink coating, but also to enhance gloss and optical density. For this reason, more preferably, the binder resin is readily dispersed in a water-based solvent, has transparency to some extent, and has compatibility with other ink components.

The binder resin used for the ink according to the present invention is not particularly limited as long as it can be dissolved or dispersed in the water-based solvent. Preferably, the binder resin is water-soluble resin or water-dispersible polymer fine particles. More preferred is water-soluble resin because of high solubility and high stability in water-based solvents. Examples of the water-soluble resin usable in the present invention include acrylic resins, styrene-acrylic resins, acrylonitrile-acrylic resins, vinyl acetate-acrylic resins, polyvinyl alcohol resins, polyurethane resins, polyamide resins, polyester resins, and polyolefin resins. Among these, preferable are acrylic resins, polyamide resins, polyvinyl alcohol resins, and polyurethane resins, and more preferable are acrylic resins.

The acrylic resins may be homopolymers of (meth)acrylate esters or copolymers of (meth)acrylate esters and one or more other copolymerizable monomers. Particularly preferable are copolymers of (meth)acrylate esters and one or more other copolymerizable monomers because they provide a high degree of freedom in designing resin structure, the copolymer is easily synthesized by a polymerization reaction, and cost is low. The proportion of the structural unit derived from the (meth)acrylate ester to be contained in the copolymer is preferably 60 to 100% by mass, and more preferably 80 to 100% by mass based on the total of the monomer units that constitute the copolymer.

Examples of the (meth)acrylate esters include alkyl(meth)acrylate ester. Among these, preferred are $C_{1-12}$ alkyl esters of (meth)acrylic acid. The (meth)acrylate esters may be used singly or in combination. Examples of preferred combinations of two or more of the (meth)acrylate esters include combinations of methyl methacrylate, $C_{1-12}$ alkyl esters of acrylic acid, and $C_{2-12}$ alkyl esters of methacrylic acid.

Examples of the one or more other copolymerizable monomers in the copolymers of (meth)acrylate esters and one or more other copolymerizable monomers include monomers having an acidic group. Examples of the monomers having an acidic group include acrylic acid, methacrylic acid, and itaconic acid. Especially, the copolymers of (meth)acrylate esters and one or more other copolymerizable monomers are preferably copolymers obtained by copolymerization of methyl methacrylate, $C_{1-12}$ alkyl esters of acrylic acid, and $C_{2-12}$ alkyl esters of methacrylic acid as main monomers with monomers having an acidic group as the other copolymerizable monomers. The proportion of the total structural units derived from the main monomers contained in the copolymer (methyl methacrylate, $C_{1-12}$ alkyl ester of acrylic acid, and $C_{2-12}$ alkyl ester of methacrylic acid) is preferably 80 to 95% by mass based on the total of the monomer units that constitute the copolymer.

At least some of the acidic groups contained in the acrylic resin are preferably neutralized with a base, from the viewpoint of enhancing the solubility of the acrylic resin in the water-based solvent. Examples of the base used for neutralization include hydroxides of alkali metals or alkaline earth metals (such as NaOH and KOH); amines (such as alkanolamines and alkylamines); and ammonia. Especially, when using the resins neutralized with amines, amine vaporizes with the water-based solvent after the ink is fixed to the recording medium, thereby to reduce the solubility of the resin. Accordingly, since a hardened ink coating containing such a resin has waterfastness, the use of such a resin neutralized with amines is preferred. Specific examples of amines include ammonia, triethylamine, 2-dimethylaminoethanol, 2-di-n-butylaminoethanol, methyldiethanolamine, 2-amino-2-methyl-1-propanol, diethanolamine, triethanolamine, and 2-methylaminoethanol.

The acid value of the water-soluble resin used in the present invention is preferably 50 to 300 mgKOH/g, and more preferably 50 to 130 mgKOH/g. At an acid value of the water-soluble resin of less than 50 mgKOH/g, the resin has insufficient solubility in water.

Because of this, the resin may not be sufficiently dissolved in the water-based solvent. Meanwhile, at an acid value of the water-soluble resin of more than 300 mgKOH/g, the ink coating becomes soft, resulting in reduced rubfastness.

The acid value of the water-soluble resin in the present invention means an amount in mg of potassium hydroxide needed to neutralize an acid contained in 1 g of the water-soluble resin. The acid value can be measured by the acid value measurement and the hydrolysis acid value measurement (total acid value measurement) according to JIS K 0070.

Although depending on the acid value and amount of the water-soluble resin, the amount of the neutralizing base is preferably 0.5 to 5 times the chemical equivalent of the acidic group contained in the water-soluble resin. If the amount of the neutralizing base is less than 0.5 times the chemical equivalent of the acidic group contained in the water-soluble resin, the effect of enhancing dispersibility of the acrylic resin may not be sufficiently obtained. Meanwhile, if the amount of the neutralizing base is more than 5 times the chemical equivalent of the acidic group contained in the water-soluble resin, the waterfastness of the ink coating may be reduced, or change in color and odor may be produced.

The weight average molecular weight of the water-soluble resin (Mw) is preferably $2.0 \times 10^4$ to $8.0 \times 10^4$, and more preferably $2.5 \times 10^4$ to $7.0 \times 10^4$. When the weight average molecular weight is less than $2.0 \times 10^4$, the ink has low adhesion. This may cause the resultant image to have insufficient rubfastness. On the other hand, when the weight average molecular weight (Mw) is more than $8.0 \times 10^4$, the viscosity of the ink becomes excessively high. This may cause reduced stability of ink injection from nozzles.

The glass transition temperature (Tg) of the binder resin is preferably 30 to 100° C. When the Tg is below 30° C., the resultant image may have insufficient rubfastness, or blocking may occur. On the other hand, when the Tg exceeds 100° C., ink coating after drying may become excessively hard to become fragile, leading to reduced rubfastness.

The amount of the binder resin is preferably 1 to 15% by mass, and more preferably 3 to 10% by mass based on the total amount of the ink. If the amount of the binder resin is less than 1% by mass, a function to fix the color material such as a pigment onto a recording medium may not be sufficiently obtained. Meanwhile, if the amount of the binder resin is more than 15% by mass, ink viscosity may increase to reduce the injection stability.

In order to further enhance the rubfastness of the ink coating, the water-based ink according to the present invention may further contain water-dispersible polymer fine particles.

The water-dispersible polymer fine particles can be composed of the same water-soluble resin as those described above. The average particle size of the water-dispersible polymer fine particles is preferably 300 nm or less, and more preferably 130 nm or less because no nozzle clogging occurs in the inkjet head, and because images having good gloss are obtained. From the viewpoint of stability in production, the average particle size of the water-dispersible polymer fine particles is preferably 30 nm or more.

The amount of the water-dispersible polymer fine particles is preferably 0.7 to 6% by mass, and more preferably 1 to 3% by mass based on the total amount of the ink from the viewpoint of the fixing properties to the recording medium and long-term storage stability of the ink.

Color Material

The color materials usable for the present invention may be dyes, pigments, or mixtures thereof. Examples of the dyes include water-soluble dyes such as acidic dyes, direct dyes, and basic dye; disperse dyes including colored polymer or colored wax; and oil-soluble dyes. Among these, preferred are pigments from the viewpoint of durability and rubfastness in the resultant image.

The pigment may be any of organic or inorganic pigments known in the art. Examples of the organic pigments include azo pigments such as azo lakes, insoluble azo pigments, condensed azo pigments, and chelate azo pigments; polycyclic pigments such as phthalocyanine pigments, perylene and perylene pigments, anthraquinone pigments, quinacridone pigments, dioxazine pigments, thioindigo pigments, isoindolinone pigments, and quinophthalone pigments; dye lakes such as basic dye lakes and acidic dye lakes; nitro pigments; nitroso pigments; aniline black; and daylight fluorescent pigments.

Specific examples of the pigments are given below, but the present invention will not be limited to the compounds exemplified.

Preferred examples of organic pigments for magenta or red and violet include: C.I. Pigment Red 2, C.I. Pigment Red 3, C.I. Pigment Red 5, C.I. Pigment Red 6, C.I. Pigment Red 7, C.I. Pigment Red 8, C.I. Pigment Red 12, C.I. Pigment Red 15, C.I. Pigment Red 16, C.I. Pigment Red 17, C.I. Pigment Red 22, C.I. Pigment Red 23, C.I. Pigment Red 41, C.I. Pigment Red 48:1, C.I. Pigment Red 53:1, C.I. Pigment Red 57:1, C.I. Pigment Red 112, C.I. Pigment Red 114, C.I. Pigment Red 122, C.I. Pigment Red 123, C.I. Pigment Red 139, C.I. Pigment Red 144, C.I. Pigment Red 146, C.I. Pigment Red 148, C.I. Pigment Red 149, C.I. Pigment Red 150, C.I. Pigment Red 166, C.I. Pigment Red 170, C.I. Pigment Red 177, C.I. Pigment Red 178, C.I. Pigment Red 220, C.I. Pigment Red 202, C.I. Pigment Red 222, C.I. Pigment Red 238, C.I. Pigment Red 245, C.I. Pigment Red 258, C.I. Pigment Red 282, C.I. Pigment Violet 19, and C.I. Pigment Violet 23.

Preferred examples of organic pigments for orange or yellow and brown include: C.I. Pigment Orange 13, C.I. Pigment Orange 16, C.I. Pigment Orange 31, C.I. Pigment Orange 34, C.I. Pigment Orange 43, C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 16, C.I. Pigment Yellow 17, C.I. Pigment Yellow 43, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 109, C.I. Pigment Yellow 110, C.I. Pigment Yellow 120, C.I. Pigment Yellow 128, C.I. Pigment Yellow 129, C.I. Pigment Yellow 138, C.I. Pigment Yellow 139, C.I. Pigment Yellow 147, C.I. Pigment Yellow 150, C.I. Pigment Yellow 151, C.I. Pigment Yellow 153, C.I. Pigment Yellow 154, C.I. Pigment Yellow 155, C.I. Pigment Yellow 175, C.I. Pigment Yellow 180, C.I. Pigment Yellow 181, C.I. Pigment Yellow 185, C.I. Pigment Yellow 194, C.I. Pigment Yellow 199, C.I. Pigment Yellow 213, and C.I. Pigment Brown 22.

Preferred examples of organic pigments for green or cyan include: C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:5, C.I. Pigment Blue 16, C.I. Pigment Blue 29, C.I. Pigment Blue 60, and C.I. Pigment Green 7.

Examples of organic pigments for black include C.I. Pigment Black 5 and C.I. Pigment Black 7. Examples of organic pigments for white include C.I. Pigment White 6.

Examples of the inorganic pigment include carbon black and titanium oxide.

In order to enhance the dispersibility of the pigment, the ink according to the present invention may further contain a pigment dispersant. Examples of the pigment dispersant include hydroxyl group-containing carboxylic acid esters, salts of long-chain polyaminoamides and high molecular weight acid esters, and salts of high molecular weight-polycarboxylic acids.

In order to stably disperse the pigment, the pigment is preferably added to the ink in the form of dispersion. The pigment dispersion may be any pigment dispersion with which dispersoids (pigment particles) can be stably dispersed in the water-based solvent. Examples of such a pigment dispersion include pigment dispersions prepared by dispersing a pigment with a dispersing resin; encapsulated pigments coated with a water-insoluble resin; and surface-modified self-dispersible pigments that can be dispersed without a dispersing resin.

The dispersing resin used to prepare the pigment dispersions by dispersing a pigment with the dispersing resin is preferably water-soluble resin. Preferred examples of the water-soluble resin include styrene-acrylic acid-acrylic acid alkyl ester copolymers, styrene-acrylic acid copolymers, styrene-maleic acid copolymers, styrene-maleic acid-acrylic acid alkyl ester copolymers, styrene-methacrylic acid copolymers, styrene-methacrylic acid-acrylic acid alkyl ester copolymers, styrene-maleic acid half ester copolymers, vinylnaphthalene-acrylic acid copolymers, and vinylnaphthalene-maleic acid copolymers. Moreover, as the dispersing resin for the pigment, a water-soluble resin usable as the binder resin may be used to disperse the pigment.

In the encapsulated pigments coated with a water-insoluble resin, the water-insoluble resin is a resin insoluble in water in the range of weak acidity to weak basicity. Specifically, preferred are resins whose solubility in an aqueous solution with a pH of 4 to 10 is 2% or less. Examples of the water-insoluble resin include acrylic resins, styrene-acrylic resins, acrylonitrile-acrylic resins, vinyl acetate resins, vinyl acetate-acrylic resins, vinyl acetate-vinyl chloride resins, polyurethane resins, silicone-acrylic resins, acrylic silicone resins, polyester resins, and epoxy resins. The average particle size of the encapsulated pigment is preferably approximately 80 to 200 nm from the viewpoint of the storage stability and color developability of the ink.

The encapsulated pigment (pigment fine particles coated with the water-insoluble resin) can be produced by any of the methods known in the art. For example, a water-insoluble resin is dissolved in an organic solvent (such as methyl ethyl ketone), and a base component is further added to partially or entirely neutralize acidic groups contained in the water-insoluble resin. A pigment and ion exchange water are added to the obtained solution, and mixed and dispersed. Subsequently, the organic solvent is removed from the obtained solution, and when necessary, ion exchange water is further added to prepare an encapsulated pigment. Alternatively, a method may be used in which a monomer is added to a solution in which a pigment and a polymerizable surfactant are dispersed, and a polymerization reaction is performed to coat the pigment with the resin.

The weight average molecular weight (Mw) of the dispersing resin and that of the water-insoluble resin are each preferably $3.0 \times 10^3$ to $5.0 \times 10^5$, and more preferably $7.0 \times 10^3$ to $2.0 \times 10^5$. The glass transition temperature (Tg) of the dispersing resin and that of the water-insoluble resin are each preferably approximately −30 to 100° C., and more preferably approximately −10 to 80° C.

The mass ratio of the pigment to the dispersing resin is preferably 100/150 to 100/30. The mass ratio is more preferably 100/100 to 100/40 from the viewpoint of enhancing durability of the image, and the injection stability and storage stability of the ink.

The pigment can be dispersed using a ball mill, sand mill, Attritor, roll mill, agitator, Henschel mixer, colloid mill, ultrasonic homogenizer, pearl mill, wet jet mill, or paint shaker, for example.

The pigment dispersion may be centrifuged or filtrated before the pigment dispersion is added to the ink, from the viewpoint of removing coarse particles from the pigment dispersion to provide a uniform particle size distribution of the pigment fine particles.

A commercially available self-dispersible pigment may be used. Examples of commercially available self-dispersible pigments include CABO-JET200 and CABO-JET300 (made by Cabot Corporation), and BONJET CW1 (made by ORIENT CHEMICAL INDUSTRIES CO., LTD.).

Surfactant

The surfactant has a function to facilitate wetting and spreading of the water-based ink on a recording medium. The surfactant usable for the present invention is not particularly limited, and the followings can be used: anionic surfactants such as dialkylsulfosuccinic acid salts, alkylnaphthalenesulfonic acid salts, and fatty acid salts; nonionic surfactants such as polyoxyethylene alkyl ethers, polyoxyethylene alkyl allyl ethers, acetylene glycols, and polyoxyethylene-polyoxypropylene block copolymers; cationic surfactants such as alkylamine salts, and quaternary ammonium salts; silicone-containing surfactants; and fluorine-containing surfactants.

Among these surfactants, preferred are silicone-containing surfactants or fluorine-containing surfactants because they allow the ink to wet and spread even on a non-water-absorbing recording medium (such as vinyl chloride sheet) and a low water-absorbing recording medium (such as paper for printing). A silicone-containing surfactant or a fluorine-containing surfactant contained in the ink according to the present invention can enlarge the dot diameters of landed ink droplets and spread the ink droplets to form a high quality image having a high density without unevenness.

Among these, particularly preferably used is the fluorine-containing surfactant. The fluorine-containing surfactant has a high surface activity. Because of this high surface activity, it is contemplated that a degree of reduction in the surface tension of the ink caused by the heat exerted from the recording medium is greater than a degree of increase in the surface tension of the ink caused by drying over the initial period of ink drying. Thus, the fluorine-containing surfactant can keep or reduce the surface tension of the ink over the initial period of ink drying. When the surface tension of the ink over the initial period of ink drying (where weight change rate is approximately 5%) is lower than that of the ink before heating, no cissing occurs even if ink droplets land on ones already applied onto the recording medium. For this reason, a smooth ink coating can be formed to provide a good gloss.

An alternative method for keeping the surface tension of the ink low over the initial period of ink drying involves controlling the amount (concentration) of the surfactant in the ink before heating to a critical micelle concentration (CMC) or less. The critical micelle concentration is determined by measuring surface tensions of a series of inks containing increasing concentrations of surfactant using a tensiometer. The concentration of surfactant is plotted against the surface tension of the ink. The surface tension becomes substantially constant within an error range over a certain surfactant concentration range. The concentration at which the surface tension reached the constant value is defined as the critical micelle concentration. Until the concentration of surfactant drops to the critical micelle concentration, the surface tension of the ink tends decrease with increasing surfactant concentration. Hence, when the concentration of surfactant in the ink is set at the critical micelle concentration, the surface tension of the ink over the initial period of ink drying can be lowered to a level equal to or lower than that before heating.

Although the critical micelle concentration in the ink depends on the kinds and amounts of the surfactant and organic solvent contained in the ink, the value of the critical micelle concentration is the same at least for identical ink compositions. The critical micelle concentration in the ink according to the present invention can be within the range of approximately 0.1 to 0.5% by mass based on the total amount of the ink.

These surfactants may be used singly or in combination. Preferably, these surfactants are used in combination with a water-soluble organic solvent having a low surface tension.

Preferred examples of the silicone-containing surfactant include polyether-modified polysiloxane compounds, and examples of commercially available products thereof include KF-351A and KF-642 made by Shin-Etsu Chemical Co., Ltd., and BYK345, BYK347, and BYK348 made by BYK-Chemie GmbH.

The fluorine-containing surfactant can be a compound which is derived from an ordinary surfactant by replacing at least some of the hydrogen atoms bonded to the carbon atoms that form its hydrophobic group by fluorine atoms. Among these, preferred are fluorine-containing surfactants having a perfluoroalkyl group.

Examples of commercially available products of the fluorine-containing surfactant include Megafac F (trade name; made by DIC Corporation) Surflon (trade name; made by ASAHI GLASS CO., LTD.), Fluorad FC (trade name; made by 3M Company), Monflor (trade name; made by Imperial Chemical Industries PLC) Zonyls (trade name; made by E.I. du Pont de Nemours and Company), Licowet VPF (trade name; made by Hoechst AG), FTERGENT (trade name; made by NEOS Corporation), and BYK340 (trade name; surface adjuster, a fluorine-modified polymer, made by BYK-Chemie GmbH).

Preferably, in order for the ink to wet and spread well on a coated paper sheet or a recording medium made of resin having low surface energy than that of normal paper, the amount of the surfactant is controlled such that the surface tension of the ink is in the range described later (15 mN/m or more and less than 35 mN/m). Specifically, the amount of the surfactant is preferably 0.01% by mass or more and less than 2.0% by mass based on the total amount of the ink.

Water-Based Solvent

The water-based solvent as used in the present invention refers to a mixture of water and a water-soluble organic solvent.

Preferably, the water-soluble organic solvent to be used in the present invention allows the water-soluble resin and other ink components to be uniformly dispersed or dissolved even when the proportion of the water-soluble organic solvent contained in the ink coating to water therein is relatively increased, such as in a later period of ink drying. Examples of the water-soluble organic solvent usable in the present invention include water-soluble organic solvents (A) having a low surface tension; and water-soluble organic solvents (B) that dissolve, soften, or swell a recording medium (such as vinyl chloride sheets) made of hydrophobic resin.

The water-soluble organic solvent (A) having a low surface tension can facilitate wetting and spreading of the ink even on a non-water-absorbing recording medium (such as vinyl chloride sheets) and a low water-absorbing recording medium (such as paper for printing). Specifically, the water-soluble organic solvent (A) having a low surface tension is preferably a water-soluble organic solvent having a surface tension at 25° C. of 45 mN/m or less.

Such a water-soluble organic solvent (A) is preferably glycol ether or 1,2-alkanediol. Examples of the glycol ether include ethylene glycol monoethyl ether, ethylene glycol monobutyl ether, diethylene glycol monoethyl ether, diethylene glycol monobutyl ether, triethylene glycol monobutyl ether, propylene glycol monopropyl ether, dipropylene glycol monomethyl ether, and tripropylene glycol monomethyl ether. Examples of the 1,2-alkanediol include 1,2-butanediol, 1,2-pentanediol, 1,2-hexanediol, and 1,2-heptanediol.

The amount of the water-soluble organic solvent (A) having a low surface tension is preferably 1 to 30% by mass based on the total amount of the ink. When the amount is less than 1% by mass, the ink insufficiently wets and spreads on a recording medium. When the amount is more than 30% by mass, drying properties are inferior, resulting in bleeding in the image.

The water-soluble organic solvent (B) that dissolves, softens, or swells a recording medium (such as vinyl chloride sheets) made of hydrophobic resin can impart penetrating properties to the ink to enhance adhesion of the ink coating to a recording medium and the rubfastness of the ink coating.

Examples of such a water-soluble organic solvent (B) include cyclic solvents containing a nitrogen atom or a sulfur atom, cyclic ester solvents, lactic acid esters, β-alkoxypropionamide, alkylene glycol diether, alkylene glycol monoether monoester, and dimethyl sulfoxide.

Examples of cyclic solvents containing a nitrogen atom include cyclic amide compounds such as 2-pyrrolidinone, N-methyl-2-pyrrolidinone, N-ethyl-2-pyrrolidinone, 1,3-dimethyl-2-imidazolidinone, ε-caprolactam, methylcaprolactam, and 2-azacyclooctanone. Examples of cyclic solvents containing a sulfur atom include 5- to 7-membered ring compounds. Preferable is sulfo lane.

Examples of the cyclic ester solvents include γ-butyrolactone and ε-caprolactone. Examples of the lactic acid esters include butyl lactate and ethyl lactate.

Examples of the β-alkoxypropionamide include a compound represented by the following formula (I):

[Formula 1]

wherein $R_1$ represents a linear or branched $C_{1-6}$ alkyl group; the linear or branched $C_{1-6}$ alkyl group is preferably methyl group, ethyl group or n-butyl group;

$R_2$ and $R_3$ each independently represent a hydrogen atom or a linear or branched $C_{1-4}$ alkyl group; $R_2$ and $R_3$ may be the same or different; the linear or branched $C_{1-4}$ alkyl group is preferably methyl group or ethyl group.

β-alkoxypropionamide represented by the formula (I) has the penetrating ability into the recording medium, readily dissolves the binder resin, and has high compatibility with the water-based solvent. Preferred examples of the β-alkoxypropionamide include, but not particularly limited to, 3-butoxy-N,N-dimethylpropionamide (BDMPA), 3-methoxy-N,N-dimethylpropionamide (MDMPA), and 3-ethoxy-N,N-diethylpropionamide (EDEPA).

The β-alkoxypropionamide represented by the formula (I) can be produced by the method described in Japanese Patent Application Laid-Open No. 2009-184079 and WO2008-102615, for example. Examples of commercially available products of the β-alkoxypropionamide represented by the formula (I) include Equamide (trade name; made by Idemitsu Kosan Co. Ltd.).

Examples of the alkylene glycol diether include diethylene glycol diethyl ether. Examples of the alkylene glycol monoether monoester include diethylene glycol monoethyl monoacetate.

Among these, preferable is β-alkoxypropionamide, and more preferable is the β-alkoxypropionamide represented by the formula (1) because these facilitate wetting of the ink even on the non-water-absorbing recording medium and penetration thereof. The β-alkoxy propionamide also allows the water-soluble resin to be stably dissolved in the ink to provide good adhesion to the recording medium. As a result, a high quality image having a gloss, rubfastness, and cissing resistance is likely to be obtained. The β-alkoxypropionamide provides a high degree of freedom of the kind and amount of the water-soluble organic solvent to be used in combination. Further, the β-alkoxypropionamide has the penetrating ability into the recording medium and facilitates drying of the ink. Thereby, the ink droplet can stay at the position on the recording medium at which the ink droplet landed, suppressing the occurrence of liquid merging and color bleeding.

The amount of the water-soluble organic solvent (B) that dissolves, softens, or swells a recording medium made of hydrophobic resin is preferably 0.1% by mass or more and less than 40% by mass, and more preferably 1 to 20% by mass based on the total amount of the ink. When the amount is less than 0.1% by mass, the effect of softening or swelling the recording medium is not sufficiently provided. When the amount is 40% by mass or more, a printer member may be swollen or deteriorated.

The water-soluble organic solvent preferably contains the water-soluble organic solvent (B), and more preferably contains both of the water-soluble organic solvent (A) and the water-soluble organic solvent (B).

The ratio of the water-soluble organic solvent (B) to be contained in the whole water-soluble organic solvent (preferably, the total of the water-soluble organic solvent (A) and the water-soluble organic solvent (B)) is preferably 20 to 40% by mass. When the ratio of the water-soluble organic solvent (B) to be contained is in the range, the ink can sufficiently spread in a wetting manner, and be dried to quickly increase the viscosity.

The water-based solvent usable for the present invention may further contain one or more other water-soluble organic solvents when necessary. Examples of the other water-soluble organic solvents include alcohols (such as methanol, ethanol, propanol, isopropanol, butanol, isobutanol, secondary butanol, and tertiary butanol); polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerol, hexanetriol, and thiodiglycol); amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine); and amides (such as formamide, N,N-dimethylformamide, and N,N-dimethylacetamide).

The total amount of the water-based solvent may be adjusted such that the surface tension and viscosity of the ink fall within the ranges described later. For example, the total amount of the water-based solvent is preferably approximately 1 to 85% by mass based on the total amount of the ink.

An amount of the water-soluble organic solvent in the ink according to the present invention is preferably contained to the extent that the binder resin can be dissolved or dispersed by the water-soluble organic solvent even in the ink coating after water completely vaporizes. Specifically, the amount of the water-soluble organic solvent in the ink is preferably 10 to 40% by mass.

Other Components

The ink according to the present invention may further contain one or more other components when necessary. Examples of the other components include fungicides, rust inhibitors, preservative agents, antifoaming agents, viscosity adjusters, penetrating agents, pH adjusters, and anti-dry agents (such as urea, thiourea, and ethyleneurea).

The preservative agent and the fungicide have a function to keep the storage stability of the ink for a long period of time. The preservative agent and the fungicide are not particularly limited, and examples thereof may include aromatic halogen compounds (such as Preventol CMK), methylene dithiocyanate, halogen nitrogen sulfur containing compounds, and 1,2-benzisothiazoline-3-one (such as PROXEL GXL).

Properties of Ink

The ink according to the present invention is preferably used as a water-based ink for inkjet recording. It is contemplated that when first ink droplets have landed onto a recording medium, the ink droplets spread in a wetting manner in the landed positions. It is contemplated that the ink droplets wet and spread on a water-absorbing recording medium because the ink droplets penetrate into the recording medium. It is contemplated, however, that the ink droplets are difficult to wet and spread on a low water-absorbing recording medium because the ink droplets do not penetrate into the recording medium. Accordingly, wetting and spreading of the ink droplets needs to be promoted in the initial period of ink drying immediately after the ink droplets have landed.

In order to promote the wetting and spreading of the ink over the initial period of ink drying, preferably, the viscosity of the ink is reduced and the surface tension is kept low over the initial period of ink drying.

In the ink according to the present invention, (1) the viscosity of the ink at 25° C. is preferably more than 10 mPa·s and 30 mPa·s or less, and more preferably 10 to 20 mPa·s over the ink weight change rate range of 0 to 10%. If the viscosity of the ink at the ink weight change rate of 10% or less is 10 mPa·s or less, the viscosity of the ink is excessively low, and the ink excessively spreads in a wetting manner, often causing color bleeding. If the viscosity of the ink is more than 30 mPa·s, the viscosity of the ink is excessively high, and the ink droplets cannot sufficiently spread in a wetting manner.

(3) The surface tension at 25° C. of the ink at the ink weight change rate of 5% is preferably lower than that before heating (initial state where the ink weight change rate is 0%). Specifically, the surface tension at 25° C. of the ink is preferably at least 0.3 mN/m lower than that before heating, and more preferably at least 0.5 mN/m lower than that before heating. If the surface tension of the ink at the ink weight change rate of 5% is higher than that before heating (initial state), the surface tension cannot be kept low. Accordingly, the ink becomes difficult to spread in a wetting manner. Additionally, overlaid ink droplets cannot be sufficiently leveled, leading to an ink coating having textured surface. Because of this, a glossy image may not be obtained. The surface tension of the ink can be measured at 25° C. by a plate method.

In the case of the ink according to the present invention, it is contemplated that the ink droplets applied later have a surface tension higher than that of the ink droplets already applied onto the recording medium. For this reason, it is contemplated that a glossy image having a smooth surface is likely to be obtained. This is also deduced from the fact that when droplets having a surface tension lower than that of a coating having fluidity are applied onto the coating, cissing occurs in the coating to provide a rough surface of the coating, as evidenced in the technical document titled "Additives for Coating, WEB Lecture Series (3)", BYK Japan K.K.

It is possible to make the surface tension of the ink at the ink weight change rate of 5% lower than the surface tension of the initial ink (or the ink at the ink weight change rate of 0%) by adding the fluorine-containing surfactant to the ink, or controlling the amount of the surfactant in the ink at a concentration equal to or smaller than the critical micelle concentration (CMC).

When another set of ink droplets further land onto the ink droplets, which have already been applied, and begin to dry, the ink droplets may move and merge with one another. This liquid merging occurs more often on low water-absorbing recording media or non-water-absorbing recording media than on water-absorbing recording media because it takes some time for the ink droplets to be fixed to their landing positions on the low water-absorbing recording medium or the non-water-absorbing recording medium. Liquid merging causes the ink droplets to displace from the positions at which they should be located. This undesirable movement of ink droplets may cause "blank streaks" that appear as the color of the background recording medium, or "color bleeding" that is the phenomenon in which ink droplets of different colors are mixed, leading to reduced image quality. Accordingly, it is contemplated that in the later period of ink drying, the ink droplets need to be fixed to their landing positions on the recording medium to suppress the undesirable movement of the ink droplets.

In order to suppress the movement of ink droplets on the recording medium over the later period of ink drying, preferably, the viscosity of the ink is rapidly increased. If the viscosity of the ink is increased with excessive rapidity, however, the surface of the ink coating cannot be leveled, thus making the ink coating surface textured and making it difficult to provide a glossy image. Accordingly, in the ink according to the present invention, (2) the viscosity of the ink at 25° C. is preferably 200 mPa·s at any one of the ink weight change rates within 35% or more and 55% or less. Namely, if the viscosity of the ink is less than 200 mPa·s when the ink weight change rate is more than 55%, liquid merging is likely to occur because the viscosity of the ink is excessively low. Meanwhile, if the viscosity of the ink is more than 200 mPa·s when the ink weight change rate is 35% or less, the ink coating solidifies before it is leveled. The viscosity of the ink is measured at 25° C. and 1 rpm by an E-type viscometer.

The ink weight change rate can be measured as follows. While the ink is stirred, the weight of the ink heated at 70° C. is measured; the obtained value is substituted into the equation below:

ink weight change rate (%)=((weight of ink before heating−weight of ink after heating)/weight of ink before heating)×100

In order for the viscosity characteristics of the ink during heating to satisfy the requirements (1) and (2) above, the ratio of the contained binder resin to the contained water-based solvent, the kind of the binder resin, and/or the composition of the water-based solvent (the ratio of the water-soluble organic solvent (A) having a low surface tension to the water-soluble organic solvent (B) for dissolving, softening or swelling the recording medium in the water-based solvent, and the amounts thereof) may be adjusted, for example.

For example, the ink can contain an amount of the water-soluble organic solvent 5 to 15 times the amount needed to saturate the binder resin. The ratio of water-soluble organic solvent/binder resin may be adjusted so that the viscosity of the ink can be increased in the state of the binder resin and the other ink components being stably dissolved or dispersed even in the later period of ink drying in which water content has already vaporized. Thereby, the movement of the ink droplets on the recording medium can be suppressed. Particularly, it is contemplated that the movement of the ink droplets on the recording medium can be further suppressed when the amount of the water-soluble organic solvent (B) for dissolving, softening or swelling the recording medium is 20 to 40% by mass based on the total amount of water-soluble organic solvents (preferably, the total amount of the water-soluble organic solvent (A) and the water-soluble organic solvent (B)).

In order to promote wetting and spreading of the ink on the low water-absorbing recording medium and the non-water-absorbing recording medium, the surface tension of the ink at 25° C. is preferably 15 mN/m or more and less than 35 mN/m, and more preferably 20 to 30 mN/m.

The viscosity at 25° C. of the ink according to the present invention is preferably 6 to 20 mPa·s from the viewpoint of obtaining the injection stability of the ink. The viscosity of the ink can be measured at 25° C. and 1 rpm by an E-type viscometer.

2. Method for Producing Water-Based Ink for Inkjet Recording

The water-based ink for inkjet recording according to the present invention is produced by mixing the binder resin, the color material, the water-based solvent, the surfactant, and when necessary, one or more other components. A mixing method is not particularly limited, and a three-one motor, a magnetic stirrer, a disperser, a homogenizer, and a line mixer may be used.

3. Method and Apparatus for Inkjet Recording Using Inkjet Recording Apparatus

An inkjet recording apparatus used for an ink jet recording method according to the present invention includes an inkjet head for ejecting the ink.

The inkjet head for ejecting the ink may use either drop-on-demand or continuous inkjet. The ejection system used in the inkjet head may employ any ejection system, such as electric-mechanical conversion system (such as single cavity type, double cavity type, bender type, piston type, share mode type or shared wall type), or electric-thermal conversion system (such as thermal inkjet type, and Bubble Jet (registered trademark) type).

Preferably, the inkjet recording apparatus further includes a heating unit for heating a recording medium, from the viewpoint of facilitating control of the speed of drying the ink droplets landed onto the recording medium. The heating unit may be any of a variety of heaters and heating rollers for heating recording media in a contact manner, or lamps for heating the front or rear surface of the recording medium in a non-contact manner. The heating unit for heating recording media in a contact manner is usually disposed on the side of the rear surface of the recording medium.

Preferably, the inkjet recording apparatus further includes a cleaning unit for cleaning the inkjet head surface including nozzle openings, and/or a drying unit for drying the ink coating printed on the recording medium.

The cleaning unit removes the solvent component of the ink coating adhering to the inkjet head surface including nozzle openings. The cleaning unit may be any cleaner that can remove the solvent component of the ink coating adhering to inkjet head surface including nozzle openings, and is not particularly limited. The cleaner may be a wiper blade, or a wiping unit including an ink absorbing member for absorbing the ink, and a function to supply a cleaning solution containing an organic solvent to the ink absorbing member. For example, in the wiping operation on the nozzle surface of the head performed by the wiping unit, specifically, the cleaning solution is impregnated into a polyester cloth in the wiping unit, and the nozzle surface of the head is rubbed with the polyester cloth.

The drying method may be effected by platen heating, infrared heating, or a heating roller, for example.

The recording medium is not particularly limited, and can be a water-absorbing recording medium (recording medium having ink absorbing properties), a low water-absorbing recording medium (recording medium having low ink absorbing properties), and a non-water-absorbing recording medium (recording medium having no ink absorbing properties).

Examples of the water-absorbing recording medium include plain paper, fabrics, inkjet paper, inkjet glossy paper, cardboard, and wood materials.

Examples of the low water-absorbing recording medium include coated paper used as paper for printing. Examples of commercially available products of the low water-absorbing recording medium include Ricoh Business Coat Gloss 100 (made by Ricoh Company, Ltd.), OK Top Coat+, OK Kanefuji+, and SA Kanefuji+ (made by Oji Paper Co., Ltd.), Super MI Dull, Aurora Coat, U-light, and Space DX (made by Nippon Paper Industries Co., Ltd.), α Mat and µ Coat (made by HOKUETSU KISHU PAPER CO., LTD.), Raicho Art and Raicho Super Art (made by Chuetsu Pulp & Paper Co., Ltd.), and Tokubishi Art and Pearl Coat N (made by Mitsubishi Paper Mills Ltd.).

Examples of the non-water-absorbing recording medium include resin base materials, metal base materials, and glass base materials.

The resin base material may be preferably resin base materials made of hydrophobic resin (including plates, sheets, and films), and composite base materials composed of the resin base material and other base material (such as paper). Examples of the hydrophobic resin include polystyrenes, acrylonitrile-butadiene-styrene copolymers (ABS resins), vinyl chloride, and polyethylene terephthalate (PET). Preferable is vinyl chloride.

Specific examples of the recording medium made of polyvinyl chloride include: SOL-371G, SOL-373M, and SOL-4701 (made by VIGteQnos Co., Ltd.); Glossy Vinyl Chloride (made by System Graphi Co., Ltd.); KSM-VS, KSM-VST, and KSM-VT (made by Kimoto Co., Ltd.); J-CAL-HGX, J-CAL-YHG, and J-CAL-WWWG (made by Kyosyo Co., Ltd., Osaka); BUS MARK V400 F vinyl and LITEcal V-600F vinyl (made by FLEXcon Company, Inc.); FR2 (made by Hanwha Corporation); LLBAU13713 and LLSP20133 (made by SAKURAI CO., LTD.); P-370B and P-400M (made by KANBO PRAS CORPORATION); S02P, S12P, S13P, S14P, S22P, S24P, S34P, and S27P (made by GRAFITYP SELFADHESIVE PRODUCTS n.v.); P-223RW, P-224RW, P-249ZW, and P-284ZC (made by LINTEC Corporation); LKG-19, LPA-70, LPE-248, LPM-45, LTG-11, and LTG-21 (made by SHINSEISHA CO., LTD.); MPI3023 (made by TOYO corporation); Napoleon Gloss Glossy Vinyl Chloride (made by NIKI Inc.); JV-610 and Y-114 (made by IKC K.K.); NIJ-CAPVC and NIJ-SPVCGT (made by Nitie Corp.); 3101/H12/P4, 3104/H12/P4, 3104/H12/P4S, 9800/H12/P4, 3100/H12/R2, 3101/H12/R2, 3104/H12/R2, 1445/H14/P3, and 1438/One Way Vision (made by Inetrcoat); JT5129PM, JT5728P, JT5822P, JT5829P, JT5829R, JT5829PM, JT5829RM, and JT5929PM (made by MACtac); MPI1005, MPI1900, MPI2000, MPI2001, MPI2002, MPI3000, MPI3021, MPI3500, and MPI3501 (made by Avery Dennison Corporation); AM-101G and AM-501G (made by Ginichi K.K.); AY-15P, AY-60P, AY-80P, DBSP137GGH, and DBSP137GGL (made by Insight Inc.); SJT-V200F and SJT-V400E-1 (made by HIRAOKA & CO., LTD.); SPS-98, SPSM-98, SPSH-98, SVGL-137, SVGS-137, MD3-200, MD3-301M, MD5-100, MD5-101M, and MD5-105 (made by Metamark UK Limited); 640M, 641G, 641M, 3105M, 3105SG, 3162G, 3164G, 3164M, 3164XG, 3164XM, 3165G, 3165SG, 3165M, 3169M, 3451SG, 3551G, 3551M, 3631, 3641M, 3651G, 3651M, 3651SG, 3951G, and 3641M (made by ORAFOL Europe GmbH); SVTL-HQ130 (made by Lami Corporation Inc.); SP300GWF and SPCLEARAD vinyl (made by Catalina Graphic Films Incorporated); RM-SJR (made by Ryoyo Shoji K.K.); Hi Lucky and New Lucky PVC (made by LG Corp.); SIY-110, SIY-310, and SIY-320 (made by Sekisui Chemical Co., Ltd.); PRINT MI Frontlit and PRINT XL Light weight banner (made by Endutex S.G.P.S.); RIJET100, RIJET145, and RIJET165 (made by RITRAMA S.p.A.); NM-SG and NM-SM (made by Nichiei Kakoh Co., Ltd.); LTO3GS (made by Lukio Co., Ltd.); Easyprint 80 and Performanceprint 80 (made by JetGraph Co., Ltd.); DSE 550, DSB 550, DSE 800G, DSE 802/137, V250WG, V300WG, and V350WG (made by HEXIS S.A.); and Digital White 6005PE and 6010PE (made by Multi-fix N.V.).

Among these, preferred are the low water-absorbing recording medium and the non-water-absorbing recording medium for example because a highly glossy image is likely to be obtained. A possible mechanism of this would be as follows. The water-absorbing recording medium absorbs the ink droplets before the ink droplets are leveled, and thus textures on the surface of the recording medium are likely to appear on the surface of the ink coating. On the other hand, the low water-absorbing recording medium and the non-water-absorbing recording medium do not absorb the ink droplets, and the ink droplets are leveled.

The ink according to the present invention has a characteristic that the viscosity tends to increase (or, a characteristic of being easy to dry) by heating, as suggested by the viscosity properties. Accordingly, in order to stably eject the ink from the inkjet head for a long period of time, preferably, the inkjet head is constantly vibrated while the ink is not injected.

The term "constantly" include not only the case where the inkjet head is positioned directly above a non-image region, but also the cases where the ink is not ejected or maintenance is performed, for example. The term "vibrate" means to vibrate the meniscus of the ink in the inkjet head to the extent that droplets are not ejected. A vibrator used for this purpose may be a piezoelectric element that is also used as an ink ejector. The form of vibration may be an ordinary driving waveform of vibration. The width of vibration is preferably a half or less of the diameter of the nozzle opening.

In order to prevent nozzle clogging more reliably, ink purging onto the non-image region is preferably performed. Ink purging is preferably performed periodically, and more preferably 200 to 300 shots are purged per single pass. More preferably, the constant vibration of the inkjet head and ink purging are performed in combination.

The heating temperature of the recording medium is preferably set such that the surface temperature of the recording medium is 35° C. or above and below 100° C. When the surface temperature is below 35° C., the ink coating may not be sufficiently dried (solidified). When the surface temperature exceeds 100° C., the recording medium may be deformed in a wave-like form.

In order to promote drying of the ink and enhance the durability of the image, preferably, an image is formed on a heated recording medium, and further heated and dried at a temperature range from 55° C. or above to below 100° C.

EXAMPLES

Hereinafter, the present invention will be described more in detail with reference to Examples, which however shall not be construed as limiting the scope of the present invention.
1. Preparation of Materials
1) Binder Resin
Joncryl 538J: (made by BASF SE, acrylic resin emulsion, solid content of 45.0% by mass, acid value: 61 mgKOH/g, Tg: 66° C., weight average molecular weight of $2 \times 10^5$ or more)
Joncryl JDX-6500: (made by BASF SE, water-soluble acrylic resin, solid content of 29.5% by mass, acid value: 74 mgKOH/g, Tg: 65° C., weight average molecular weight of $1.0 \times 10^4$)
P-2: amine-neutralized water-soluble resin synthesized in Synthesis Example below (solid content of 20% by mass, acid value: 72 mgKOH/g, Tg: 82° C., weight average molecular weight of $3.0 \times 10^4$)
Synthesis Example for P-2
186 parts by mass of 2-propanol was charged in a flask equipped with a dropping funnel, a reflux tube, a nitrogen introducing tube, a thermometer and a stirrer, and heated under reflux while nitrogen was bubbled. To the obtained 2-propanol, 76 parts by mass of methyl methacrylate, 13 parts by mass of 2-ethylhexyl acrylate, and 11 parts by mass of methacrylic acid were added to prepare a mixed solution. A monomer solution containing 0.5 parts by mass of an initiator (AIBN) dissolved therein was added dropwise to the obtained mixed solution over 2 hours through the dropping funnel. After addition, heating under reflux was continued for a further 5 hours, and then the flask was allowed to stand for cooling. Then, 2-propanol was distilled off under reduced pressure. Thus, a copolymer of a (meth)acrylate ester and other copolymerizable monomer (i.e., acrylic copolymer resin) was obtained.

67.8 parts by mass of ion exchange water and 12.2 parts by mass of N,N-dimethylaminoethanol as a neutralizing base were added to 20 parts by mass of the obtained acrylic copolymer resin. The resin was dissolved by heating and stirring at 70° C. Thus, an aqueous solution of Water-Soluble Resin P-2 having a resin solid content of 20% by mass was obtained. The amount of N,N-dimethylaminoethanol to be added was adjusted to 1.05 times the chemical equivalent of the acidic group in the acrylic copolymer resin.
2) Surfactant
BYK-340: fluorine-containing surfactant (made by BYK-Chemie GmbH)
KF-351: silicone-containing surfactant (made by Shin-Etsu Chemical Co., Ltd.)
3) Water-Based Solvent
Water-Soluble Organic Solvent (A)
  HDO: 1,2-hexanediol
  DPGME: dipropylene glycol monomethyl ether
Water-Soluble Organic Solvent (B)
  BDMPA: 3-butoxy-N,N-dimethylpropionamide
  2-PDN: 2-pyrrolidinone
  Others: ion exchange water 1. Evaluation of Monocolor Image Example 1

Preparation of Cyan Pigment Dispersion 20 parts by mass of FLOWLEN TG-750W (solid content of 40% by mass, made by Kyoeisha Chemical Co., Ltd.) as a pigment dispersant was added to 65 parts by mass of ion exchange water. 15 parts by mass of C.I. Pigment Blue 15:3 was added to the solution, premixed, and dispersed by a sand grinder filled with zirconia beads of 0.5 mm at a volume rate of 50%. Thus, a cyan pigment dispersion containing 15% by mass of pigment solid content was obtained.
Preparation of Ink C-1
As water-soluble organic solvents, 9 parts by mass of 1,2-hexanediol (HDO), 5 parts by mass of dipropylene glycol monomethyl ether (DPGME), and 4 parts by mass of 3-butoxy-N,N-dimethylpropionamide (BDMPA) were added to 20 parts by mass of ion exchange water to obtain a water-based solvent. 20.3 parts by mass of Joncryl JDX-6500 as the binder resin, and 0.1 parts by mass of BYK-340 as the surfactant were added to the obtained water-based solvent, and stirred. The total amount of the solution was adjusted with ion exchange water so as to be 80 parts by mass. 20 parts by mass of the cyan pigment dispersion prepared above was added to the obtained solution, and stirred. The obtained solution was filtered with a 0.8 μm-pore size filter to obtain Cyan Ink C-1.

Examples 2 to 4

Inks C-2 and C-3 were prepared in the same manner as in Example 1 except that the composition of the ink was changed as shown in Table 1.

Comparative Examples 1 to 5

Inks C-4 to C-8 were prepared in the same manner as in Example 1 except that the composition of the ink was changed as shown in Table 1.

The viscosity and surface tension of the obtained ink were measured according to the following methods.
Measurement of Viscosity
The viscosity was measured using a rotary viscometer with a thermostat (made by TOKI SANGYO CO., LTD.: VISCOMETER TV-33, V1SCOMATE VM-150III). The thermostat was set at 25° C. The viscosity at 25° C. of the ink before heating (initial ink) and the weight at 25° C. (weight of the ink before heating) were measured one minute later after the measurement was started.

Next, while the ink was stirred and heated at 70° C. by a heater, the viscosity of the ink was measured at an interval of a predetermined time by an E-type viscometer on the condition of 25° C. and 1 rpm. Then, the weight of the ink (after heating) was measured when the viscosity at 25° C. was 10 mPa·s, 30 mPa·s, and 200 mPa·s. The values obtained by the measurement were substituted into the equation below to calculate the ink weight change rate:

ink weight change rate (%)=((weight of ink before heating−weight of ink after heating)/weight of ink before heating)×100

Measurement of Surface Tension

The surface tension of the ink was measured at 25° C. using an automated tensiometer CVBP-Z type made by Kyowa Interface Science Co., Ltd. according to the Wilhelmy method (plate method).

Moreover, using the obtained ink, an image was formed by an inkjet recording apparatus as follows.

Method for Forming Image

KM512MN (made by Konica Minolta IJ Technologies, Inc.) was used as inkjet heads. The inkjet head has a driving frequency of 13 kHz and a minimum droplet amount of 14 pl. In a drop-on-demand inkjet printer equipped with four rows of the inkjet heads, the obtained ink (cyan ink) was charged into one of the inkjet heads.

Then, the rear surface (surface opposite to the surface facing the inkjet head) of a recording medium was heated by a contact type heater (heating unit) provided in the inkjet printer. 250 shots of the ink were purged onto an ink purging position to clean the inkjet head while using a wiper blade maintenance unit. The ink purging position and maintenance unit are provided in a head installation position of the inkjet printer.

Then, solid images having a resolution of 720 dpi×720 dpi and 10 cm×10 cm were formed at coverage of 100% and 50%, respectively, on a recording medium (MD5, soft vinyl chloride sheet used for solvent inkjet printers; made by Metamark UK Limited). In this way printed images were formed. Except for Example 4, a fine vibrating pulse was applied to constantly vibrate the inkjet head such that the meniscus of the ink in the inkjet head was finely vibrated while the ink was not injected.

The obtained images were evaluated for the presence of "blank streak (or occurrence of liquid merging)." Further, ink ejection stability was evaluated according to the following method.

Liquid Merging Resistance (Blank Streak)

For the 50% coverage printed image, the shapes of neighboring dots were observed with a microscope. The liquid merging resistance was evaluated according to the following criterion:

Good: boundaries among dots slightly bulge, but each dot still retains its shape Fair: boundaries among dots slightly bulge; some of the dots are merged with neighboring ones and no longer retain their shape Bad: dots are merged with neighboring ones to form oval shape.

In the criterion of evaluation above, "Good" and "Fair" are judged as being practically preferred.

Ejection Stability 10 solid images were continuously formed on an A4-sized recording medium, and the inkjet head was allowed to stand under at 25° C. and 55% RH for 1 minute. Subsequently, another solid image was again formed, and the quality of the obtained 11th solid image was visually observed. The ejection stability of the ink was evaluated according to the following criterion.

Excellent: no image defects (streaks) were found, and a uniform image is provided, Good: faint streaking is found in an initial writing portion of the image (in the range not more than 2 mm from the initial writing portion), Fair: image defects (streaks) due to ink injection failure are slightly found Bad: image defects (streaks) due to ink injection failure are found.

In the criterion of evaluation above, "Excellent," "Good" and "Fair" are judged as being practically preferred.

Further, the gloss of the coating of the obtained ink was evaluated according to the following method.

Evaluation of Gloss

As the recording medium, a soft vinyl chloride sheet MD5 (made by Metamark UK Limited) was prepared. The ink was applied onto the soft vinyl chloride sheet by a wire bar such that the ink deposition amount was approximately 16 g/m², and dried. The 60° gloss level of the obtained coating was measured. The gloss level was measured at 60° using a variable angle gloss meter (VGS-1001DP) made by Nippon Denshoku Industries Co., Ltd. The gloss was evaluated according to the following criterion.

Good: the 60° gloss level is 85% or more and less than 100%

Fair: the 60° gloss level is 70% or more and less than 85%

Bad: the 60° gloss level is less than 70%

In the criterion of evaluation above, "Good" and "Fair" are judged as being practically preferred.

Figure 1A:
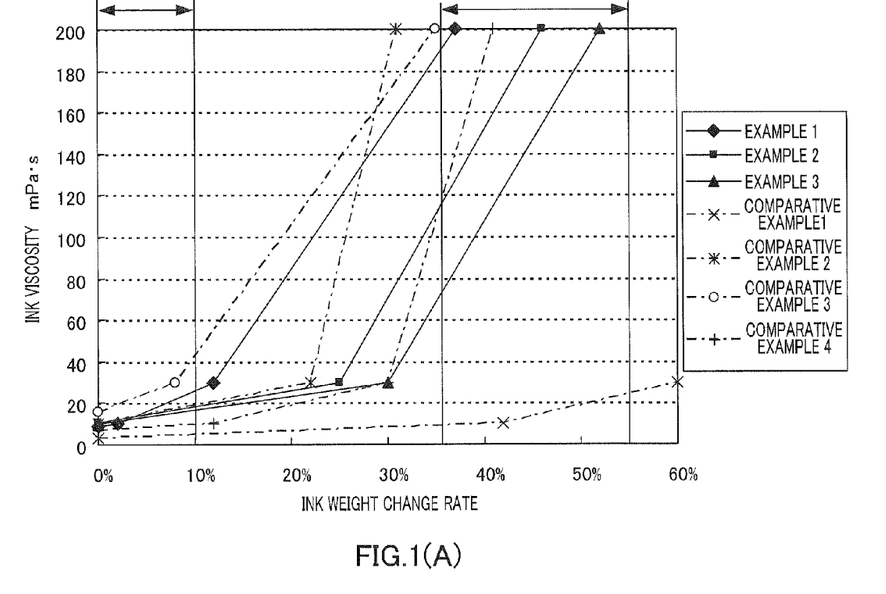
FIGS. 1A and 1B are graphs of ink viscosity vs. ink weight change rate.
Figure 1B:
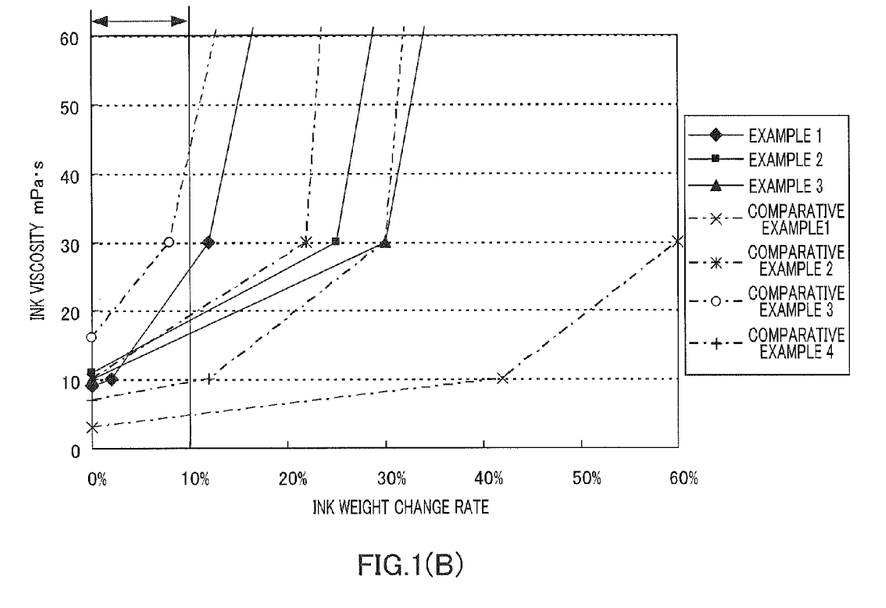

These measurement results are shown in Table 1. The viscosities of the respective inks are shown in the graph of FIGS. 1A and 1B. FIG. 1B is a graph in which the range of the viscosity in FIG. 1A is enlarged. For convenience, FIGS. 1A and 1B show ink viscosity characteristics in which measured points for each ink are connected to one another by linear lines, but the actual viscosity behavior between the measured points will not be limited to this.

TABLE 1

|  |  |  | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|---|---|
| Composition | Ink No. |  | C-1 | C-2 | C-3 | C-3 | C-4 | C-5 | C-6 | C-7 | C-8 |
|  | Water-soluble resin[note] (parts by mass) | 538J |  |  |  |  | 6 |  |  |  |  |
|  |  | JDX-6500 | 6 |  |  |  |  | 4 | 10 | 5 |  |
|  |  | P-2 |  | 6 | 5 | 5 |  |  |  |  | 5 |
|  | Color material[note] (parts by mass) | Cyan pigment dispersion | 3 | 3 | 3 | 3 | 3 | 3 | 3 | 3 | 3 |
|  | Surfactant (parts by | BYK-340 | 0.1 | 0.1 | 0.1 | 0.1 | 0.1 | 0.1 | 0.1 | 0.1 |  |
|  |  | KF-351 |  |  |  |  |  |  |  |  | 0.3 |

TABLE 1-continued

|  |  | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|---|
| mass) | | | | | | | | | | |
| Water-based solvent (parts by mass) | HDO | 9 | 10 | 15 | 15 | 10 | 10 | 10 | 5 | 15 |
| | DPGME | 5 | 5 | 5 | 5 | | 8 | 8 | 7 | 5 |
| | BDMPA | 4 | 5 | | | | 4 | 4 | | |
| | 2-PDN | | | 10 | 10 | 10 | | | 10 | 10 |
| | Ion exchange water | 41.6 | 29.9 | 24.9 | 24.9 | 46.6 | 44.3 | 24 | 41 | 24.7 |
| Initial viscosity (mPa·s) | | 9 | 11 | 10 | 10 | 5 | 10 | 16 | 6 | 10 |
| Ink weight change rate (%) | At 10 mPa·s | 2 | 0 | 0 | 0 | 42 | 0 | 0 | 12 | 0 |
| | At 30 mPa·s | 12 | 25 | 30 | 30 | 60 | 22 | 8 | 30 | 0.3 |
| | At 200 mPa·s | 37 | 46 | 52 | 52 | >60 | 31 | 35 | 41 | 0.52 |
| Surface tension (mN/m) | Initial state | 25 | 23 | 23 | 23 | 19 | 23 | 23 | 23 | 25 |
| | At weight change rate of ink of 5% | 24.5 | 22.5 | 22 | 22 | 18.5 | 22 | 22 | 22 | 25.5 |
| Recording condition | Constantly vibrated | Yes | Yes | Yes | No | Yes | Yes | Yes | Yes | Yes |
| | Recording medium | VC. sheet | VC. sheet | VC. sheet | VC. sheet | VC. sheet | VC. sheet | VC. sheet | VC. sheet | VC. sheet |
| Result of evaluation | Gloss | Good | Good | Good | Good | Fair | Bad | Bad | Good | Bad |
| | Blank streaks | Good | Good | Good | Good | Bad | Good | Good | Good | Good |
| | Ejection stability | Good | Good | Good | Fair | Good | Bad | Bad | Good | Good |

*note*The values of the water-soluble resin and the color material each represent parts by mass of the solid content.
"VC" represents vinyl chloride As seen from Table 1, the inks in Examples 1 to 3 produce no blank streaks or bleeding, and provide a glossy image. Meanwhile, the inks in Comparatives Example 1 to 3 and 5 at least produce blank streaks or provide no gloss.

Specifically, it is suggested that the inks in Examples 1 to 3 have such a high viscosity that the ink can be leveled in the later period of ink drying, and the ink droplets can stay in their landing position to suppress the occurrence of blank streaks. Further, it is suggested that ink droplets can properly spread in a wetting manner over the initial to later period of ink drying, leading to a smooth surface of the ink coating and a gloss thereof. In Example 4, it turns out that the injection stability of the ink is slightly reduced because constant vibration of the meniscus of the ink in the inkjet head was not performed.

On the other hand, it is suggested that in the ink in Comparative Example 1, an excessively low viscosity in the later period of ink drying causes liquid merging to generate blank streaks. Further, it is suggested that in the ink in Comparative Example 2, an excessively high viscosity in the later period of ink drying prevents sufficiently leveling of the ink coating, leading to an image having a dull surface.

It is suggested that in the ink in Comparative Example 3, a high viscosity in the initial period of ink drying prevents sufficiently leveling of the ink coating, leading to an image having a dull surface.

2. Evaluation of Color Image

Example 5

Preparation of Yellow Pigment Dispersion (Y)

A yellow pigment dispersion was prepared in the same manner as in Example 1 except that C.I. Pigment Blue 15:3 in preparation of the cyan pigment dispersion was replaced by C.I. Pigment Yellow 74.
Preparation of Magenta Pigment Dispersion (M)

A magenta pigment dispersion was prepared in the same manner as in Example 1 except that C.I. Pigment Blue 15:3 in preparation of the cyan pigment dispersion was replaced by C.I. Pigment Red 122.

Preparation of Black Pigment Dispersion (K)

A black pigment dispersion was prepared in the same manner as in Example 1 except that C.I. Pigment Blue 15:3 in preparation of the cyan pigment dispersion was replaced by carbon black.

Using the obtained yellow pigment dispersion (Y), magenta pigment dispersion (M), and black pigment dispersion (K), and the cyan pigment dispersion (C) prepared in Example 1, inks of the respective colors (Y-1, M-1, K-1, and C-1) were prepared in the same manner as in Example 1.

Comparative Example 6

Using the obtained yellow pigment dispersion (Y), magenta pigment dispersion (M), and black pigment dispersion (K), and the cyan pigment dispersion (C) prepared in Example 1, inks of the respective colors (Y-4, M-4, K-4, and C-4) were prepared in the same manner as in Comparative Example 1.

Comparative Example 7

Using the obtained yellow pigment dispersion (Y), magenta pigment dispersion (M), and black pigment dispersion (K), and the cyan pigment dispersion (C) prepared in Example 1, inks of the respective colors (Y-7, M-7, K-7, and C-7) were prepared in the same manner as in Comparative Example 4.

The obtained inks were evaluated for their viscosity and surface tension as well as for the gloss of their coatings in the same manner as described above.

The obtained inks of the four colors were charged into the respective inkjet heads in the inkjet recording apparatus. Then, a color image was formed in the same manner as described above, and the liquid merging resistance and ejection stability for the ink of the obtained image were evaluated.

Further, an image was formed and the occurrence of color bleeding was evaluated according to the following method. Color bleeding is the phenomenon in which ink droplets of different colors are mixed at positions where they are applied adjacent to one another on a recording medium, causing blurring at the color boundary.

Evaluation of Color Bleeding

A lattice consisting of thin lines of the four colors was printed, and the image was observed both visually and microscopically, Color bleeding resistance was evaluated according to the following criterion:

Excellent: no color bleeding is found for all of the colors
Good: slight color bleeding is found between two of the colors by microscopic observation, but not recognized by visual observation, and gives no influence on the image quality
Fair: color bleeding is found even by visual observation
Bad: color bleeding is significantly produced, and the image quality is remarkably reduced In the criterion of evaluation above, "Excellent" and "Good" are judged as being practically preferred.

The results of evaluation of Example 5 and Comparative Examples 6 and 7 are shown in Table 2.

streaks. It turns out that in the color image formed with the respective inks obtained in Comparative Example 7, an excessively low viscosity in the initial period in the drying causes the color bleeding due to excessive wetting and spreading, while the image has a gloss.

INDUSTRIAL APPLICABILITY

The present invention can provide a water-based ink for inkjet recording that can form a glossy image free from blank streaks and color bleeding caused by liquid merging.

What is claimed is:

1. A water-based ink for inkjet recording comprising a binder resin, a color material, a surfactant, and a water-based solvent, wherein:

TABLE 2

|  |  |  | Ex. 5 | | | | Comp. Ex. 6 | | | | Comp. Ex. 7 | | | |
| --- | --- | --- | --- | --- | --- | --- | --- | --- | --- | --- | --- | --- | --- | --- |
|  | Ink No. |  | K-1 | C-1 | M-1 | Y-1 | K-4 | C-4 | M-4 | Y-4 | K-7 | C-7 | M-7 | Y-7 |
| Composition | Water-soluble resin[note] | 538J |  |  |  |  | 6 | 6 | 6 | 6 |  |  |  |  |
|  |  | JDX-6500 | 6 | 6 | 6 | 6 |  |  |  |  | 5 | 5 | 5 | 5 |
|  |  | P-2 |  |  |  |  |  |  |  |  |  |  |  |  |
|  | Color material[note] (parts by mass) | Black (K) pigment dispersion | 3 |  |  |  | 3 |  |  |  | 3 |  |  |  |
|  |  | Cyan (C) pigment dispersion |  | 3 |  |  |  | 3 |  |  |  | 3 |  |  |
|  |  | Magenta (M) |  |  | 3 |  |  |  | 3 |  |  |  | 3 |  |
|  |  | Yellow (Y) pigment |  |  |  | 3 |  |  |  | 3 |  |  |  | 3 |
|  | Surfactant (parts by mass) | BYK-340 | 0.1 | 0.1 | 0.1 | 0.1 | 0.1 | 0.1 | 0.1 | 0.1 | 0.1 | 0.1 | 0.1 | 0.1 |
|  |  | KF-351 |  |  |  |  |  |  |  |  |  |  |  |  |
|  | Water-based solvent (parts by mass) | HDO | 9 | 9 | 9 | 9 | 10 | 10 | 10 | 10 | 5 | 5 | 5 | 5 |
|  |  | DPGME | 5 | 5 | 5 | 5 |  |  |  |  | 7 | 7 | 7 | 7 |
|  |  | BDMPA | 4 | 4 | 4 | 4 |  |  |  |  |  |  |  |  |
|  |  | 2-PDN |  |  |  |  | 10 | 10 | 10 | 10 | 10 | 10 | 10 | 10 |
|  |  | Ion exchange water | 41.6 | 41.6 | 41.6 | 41.6 | 46.6 | 46.6 | 46.6 | 46.6 | 41 | 41 | 41 | 41 |
| Initial viscosity (mPa·s) |  |  | 9 | 9 | 9 | 9 | 5 | 5 | 5 | 5 | 6 | 6 | 6 | 6 |
| Ink weight change rate (%) | At 10 mPa·s |  | 3 | 2 | 3 | 2 | 40 | 42 | 45 | 38 | 14 | 12 | 13 | 11 |
|  | At 30 mPa·s |  | 25 | 25 | 26 | 24 | 63 | 60 | 65 | 58 | 32 | 30 | 31 | 29 |
|  | At 200 mPa·s |  | 35 | 37 | 39 | 37 | >65 | >65 | >65 | >65 | 40 | 41 | 41 | 43 |
| Surface tension (mN/m) | Change from initial state to 5% ink weight change rate |  | −1 | −1.1 | −0.8 | −1.1 | −0.6 | −0.7 | −0.8 | −0.8 | −1.6 | −1.3 | −1.5 | −1.4 |
| Recording condition | Constantly vibrated |  | Yes | Yes | Yes | No | Yes | Yes | Yes | Yes | Yes | Yes | Yes | Yes |
|  | Recording medium |  | VC. sheet | VC. sheet | VC. sheet | VC. sheet | VC. sheet | VC. sheet | VC. sheet | VC. sheet | VC. sheet | VC. sheet | VC. sheet | VC. sheet |
| Result of evaluation | Gloss |  | Good | Good | Good | Good | Fair | Fair | Fair | Fair | Good | Good | Good | Good |
|  | Blank streaks |  | Good | Good | Good | Good | Bad | Bad | Bad | Bad | Good | Good | Good | Good |
|  | Ejection stability |  | Good | Good | Good | Good | Good | Good | Good | Good | Good | Good | Good | Good |
|  | Color bleeding |  | Good | Good | Good | Good | Bad | Bad | Bad | Bad | Bad | Bad | Bad | Bad |

[note]The values of the water-soluble resin and the color material each represent parts by mass of the solid content.
"VC" represents vinyl chloride As seen from Table 2, the color image formed with the inks of the respective colors in Example 5 generates no blank streaks caused by liquid merging or no color bleeding caused by excessive wetting and spreading, and provides a good glossy image. It also turns out that ink ejection stability is good.

Meanwhile, it turns out that in the color image obtained in Comparative Example 6, an excessively low viscosity in the initial time in the drying period causes color bleeding due to excessive wetting and spreading, and an excessively low viscosity in the later period of ink drying period causes blank the surfactant is a fluorine-containing surfactant;
the water-based solvent comprises:
  water,
  a water-soluble organic solvent (A) having a surface tension of 45 mN/m or less, and
  a water-soluble organic solvent (B) selected from the group consisting of cyclic solvents containing a nitrogen atom or a sulfur atom, cyclic ester solvents, lactic acid esters, β-alkoxypropionamide, alkylene glycol diether, alkylene glycol monoether monoester, and dimethyl sulfoxide, and an amount of the water-soluble organic solvent (B) is 20 to 40% by mass based on a total amount of the water-soluble organic solvent (A) and the water-soluble organic solvent (B); and the ink satisfies the condition that, where an ink weight change rate when the ink is heated is expressed by the following equation:

$$\text{ink weight change rate (\%)} = ((\text{weight of ink before heating} - \text{weight of ink after heating}) / \text{weight of ink before heating}) \times 100$$

(1) a viscosity of the ink is more than 10 mPa·s and 30 mPa·s or less, the viscosity being measured by an E-type viscometer at 25° C. and 1 rpm over the ink weight change rate range of 0% to 10%,
(2) a viscosity of the ink is 200 mPa·s at any one of the ink weight change rate within 35% or more and 55% or less, the viscosity being measured by the E-type viscometer at 25° C. and 1 rpm, and
(3) a surface tension at 25° C. of the ink at the ink weight change rate of 5% is lower than a surface tension at 25° C. of the ink at the ink weight change rate of 0%.

2. The water-based ink for inkjet recording according to claim 1, wherein the water-based solvent comprises β-alkoxypropionamide.

3. The water-based ink for inkjet recording according to claim 1, wherein the binder resin is a water-soluble resin.

4. The water-based ink for inkjet recording according to claim 1, wherein the color material is a pigment.

5. The water-based ink for inkjet recording according to claim 3, wherein the water-soluble resin is an acrylic resin having an acid value of 50 to 300 mgKOH/g.

6. An inkjet recording method comprising ejecting the water-based ink for inkjet recording according to claim 1 from an inkjet head for landing onto a recording medium, wherein:

a meniscus of the ink in the inkjet head is constantly vibrated while the ink is not ejected.

7. The inkjet recording method according to claim 6, further comprising ejecting the ink from the inkjet head to a non-image region.

8. The inkjet recording method according to claim 6, further comprising heating ink droplets applied onto the recording medium.

9. The inkjet recording method according to claim 6, wherein the recording medium is a non-water-absorbing recording medium or a low water-absorbing recording medium.

10. An inkjet recording apparatus comprising an inkjet head, the inkjet head containing the water-based ink for inkjet recording according to claim 1.

11. The inkjet recording apparatus according to claim 10, further comprising a heating unit for heating ink droplets applied onto the recording medium.

12. The inkjet recording apparatus according to claim 10 further comprising a cleaning unit for cleaning a surface of the inkjet head, the surface including a nozzle opening formed therein.

* * * * *